United States Patent [19]

Lee

[11] Patent Number: 4,844,799

[45] Date of Patent: * Jul. 4, 1989

[54] FILTRATION APPARATUS HAVING SPACED-APART DRIVING MEMBERS FOR CHANGING A SIZE OF A TREATMENT ZONE

[76] Inventor: Chung Y. Lee, 375-21, Daebang-Dong, Dongjak-Ku, Seoul, Rep. of Korea

[*] Notice: The portion of the term of this patent subsequent to Oct. 7, 2003 has been disclaimed.

[21] Appl. No.: 182,735

[22] Filed: Apr. 18, 1988

Related U.S. Application Data

[63] Continuation-in-part of Ser. No. 886,437, Jul. 17, 1986, abandoned.

[51] Int. Cl.⁴ .............................................. B01D 35/18
[52] U.S. Cl. ...................... 210/179; 210/241; 210/374; 210/394; 210/393; 210/403; 210/770; 210/780; 100/112; 100/92
[58] Field of Search ............... 210/178, 179, 185, 241, 210/374, 383, 391, 393, 394, 396, 398, 402, 403, 408, 409, 411, 412, 770, 780, 414; 100/93 S, 92, 112, 117

[56] References Cited

U.S. PATENT DOCUMENTS

| | | | |
|---|---|---|---|
| 869,720 | 10/1907 | Matthias | 210/404 |
| 1,268,273 | 6/1918 | Nicholas | 210/403 |
| 1,594,999 | 8/1926 | Carter | 210/393 |
| 2,177,560 | 10/1939 | Coogan et al. | 210/383 |
| 2,181,404 | 11/1939 | Koppitz et al. | 210/414 |
| 3,401,801 | 9/1968 | Wedemeyer et al. | 210/394 |
| 3,403,786 | 10/1968 | Luthi | 210/393 |
| 3,705,649 | 12/1972 | Arvanitakis | 210/770 |
| 3,739,915 | 6/1973 | Kehoe et al. | 210/397 |
| 3,939,763 | 2/1976 | Sato | 100/117 |
| 4,248,709 | 2/1981 | Irving | 210/403 |
| 4,368,125 | 1/1983 | Murray | 210/374 |
| 4,380,496 | 4/1983 | Maffet | 210/185 |
| 4,406,795 | 9/1983 | Takacs et al. | 210/780 |
| 4,439,320 | 3/1984 | Blok | 210/394 |
| 4,615,801 | 10/1986 | Lee | 210/185 |
| 4,755,291 | 7/1988 | Lee | 210/393 |

FOREIGN PATENT DOCUMENTS 751551  9/1933  France ................................ 100/117

Primary Examiner—Richard V. Fisher
Assistant Examiner—Cynthia L. Nessler
Attorney, Agent, or Firm—Birch, Stewart, Kolasch & Birch

[57] ABSTRACT

A filtration apparatus includes a tapered conveying cylinder, a rotating filtration cylinder disposed around the tapered conveying cylinder, a pair of spaced-apart driving members movably supported to the rotating filtration cylinder for freely changing a size of a treatment zone between the tapered conveying cylinder and rotating filtration cylinder and one or more steam injection pipes disposed above the rotating filtration cylinder. The solid waste product in the treatment zone is heated and cleaned away by spraying the surface of the cylinder with hot steam through nozzles of the injection pipes, and freely changing the size of the treatment zone on demand.

11 Claims, 2 Drawing Sheets

FILTRATION APPARATUS HAVING SPACED-APART DRIVING MEMBERS FOR CHANGING A SIZE OF A TREATMENT ZONE

CROSS-REFERENCE TO RELATED APPLICATION

This application is a continuation-in-part application of Ser. No. 886,437 filed on July 17, 1986, for "FILTRATION APPARATUS", now abandoned.

BACKGROUND OF THE INVENTION

1. Field of the Invention

The present invention relates to an improved filtration and washing apparatus utilizing a tapered screw conveying cylinder and a rotating filtration cylinder disposed around the tapered screw conveying cylinder and spaced-apart driving members for moving the filtration cylinder and more particularly to a filtration apparatus having spaced-apart driving members which changes size of a treatment zone between the tapered screw conveying cylinder and the rotating filtration cylinder by the movement of the spaced-apart driving members relative to each other. According to the present invention, the waste product discharged from manufacturing factories such as leather manufacturing factories or food processing factories is treated by dehydration and filtration by being conveyed through the treatment zone including the washing and heating system. The solid waste materials formed around the rotating filtration cylinder are removed by the spray with hot steam during the filtration operation.

2. Description of the Prior Art

It is conventional practice in the prior art to use a tapered conveying cylinder including internal heating system and a filtration cylinder. However, since such a filtration apparatus does not include movable spaced-apart supporting members for changing the size of the treatment zone between the tapered conveying cylinder and filtration cylinder, such filtration apparatus cannot expect to improve the filtration, conveying, grinding and washing of the waste product to be treated, and also such filtration apparatus cannot be used for a long time. Also, the size of the treatment zone of such filtration apparatus cannot freely change on demand. Furthermore, since such prior art filtration apparatus rotates very fast and is provided with holes without a filter thereof, which collects the roasted dregs therein, the prior art apparatus cannot completely filter and clean away the solid materials from the holes of the filtration cylinder.

Also, such filtration apparatus utilizes hot vapor through the inside of the conveying cylinder, the cylinder can become cracked due to such a high temperature of the hot vapor.

OBJECTS AND SUMMARY OF THE INVENTION

Accordingly, it is an object of the present invention to provide an improved filtration apparatus having spaced-apart driving members for freely changing a size of a treatment zone on demand.

Another object of the present invention is to provide an improved filtration apparatus which is structured for heating the solid waste product by spraying the surface of the cylinder with hot steam through a plurality of nozzles of one or more steam injection pipes.

Still another object of the present invention is to an improved filtration having a support track disposed around the rotating filtration which is provided with a plurality of slots for engaging a plurality of pins of a roller mounted to a support for slowly rotating the filtration cylinder.

A further object of the present invention is to provide an improved filtration apparatus which is provided with such steam injection pipes for easily washing the solid waste material collected in holes of the filtration cylinder through a filter by spraying the surface of the cylinder with the hot steam.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a filtration apparatus comprising a tapered conveying cylinder, a rotating filtration cylinder disposed around the tapered conveying cylinder, a pair of spaced-apart driving members supported to the rotating filtration cylinder for freely changing a size of a treatment zone between the tapered conveying cylinder and rotating filtration cylinder, and one or more steam injection pipes disposed above the rotating filtration cylinder whereby the solid waste material in the treatment zone is heated and cleaned away by spraying the surface of the cylinder with hot steam through nozzles of the injection pipes, and freely changing the size of the treatment zone on demand.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE DRAWINGS

Figure 1:
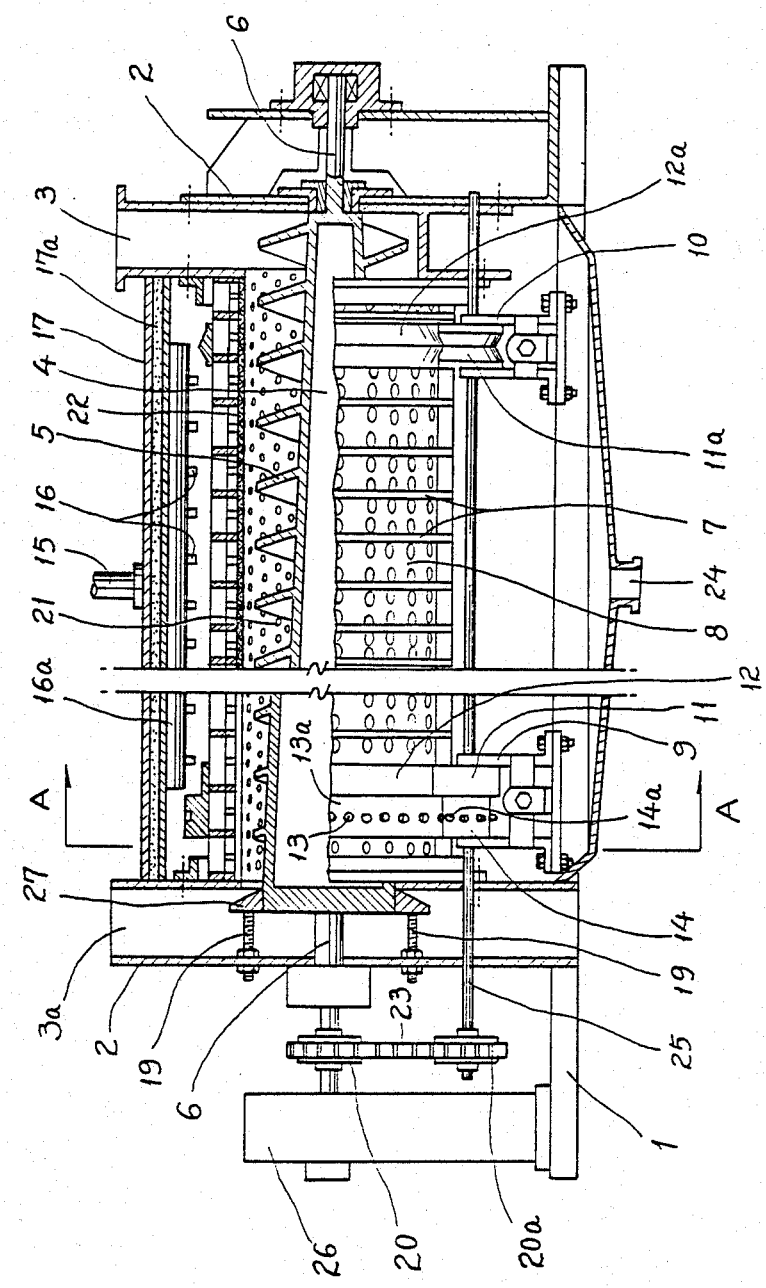
FIG. 1 is a side view of the present invention containing cut-away portions in order to illustrate the construction of the filtration apparatus of the present invention.
Figure 2:
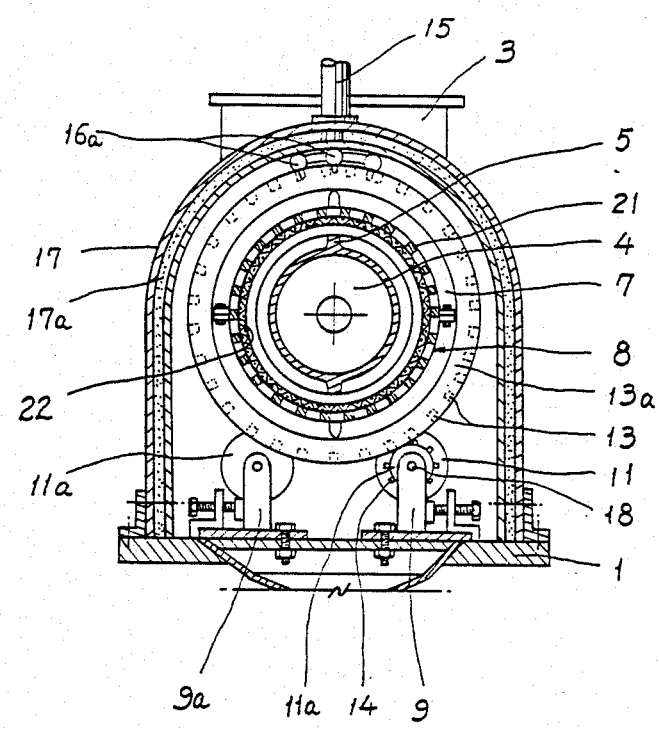
FIG. 2 is a cross-sectional view of the present invention taken along the line A—A of FIG. 1 showing spaced-apart driving members for freely changing a size of a treatment zone between a conveying cylinder and a rotating filtration cylinder.

Referring now in detail to the drawing for the purpose of illustrating the present invention, the filtration apparatus of the present invention as shown in FIGS. 1 and 2 comprises a tapered, rotating cylinder 4 having a plurality of conveying screws 5, and inlet 3, an outlet 3a, a rotating filtration cylinder 8 disposed around the tapered, rotating cylinder, a housing means 17 enclosing the rotating filtration cylinder 8, and at least one steam injection pipe 16a disposed above the rotating filtration cylinder 8. The tapered, rotating cylinder 4 is attached to a supporting foundation 1 by one end rotating shaft 6 and the other end rotating shaft 6 through supporters 2 so that the tapered cylinder 4 can rotate. The supporters 2 are disposed at one end and the other end portions of the supporting foundation 1. The conveying screws 5 are gradually reduced in size from the inlet 3 to the outlet 3a. The rotating filtration cylinder 8 is positioned in close proximity to the circumference of the conveying screws 5 of the tapered cylinder 4 for conveying and grinding the waste product. The rotating filtration cylinder 8 includes a filter 22 and a plurality of holes 21 therein for filtering the solid waste material. The rotating filtration cylinder 8 is provided with a plurality of rigid circumference members 7 disposed around the rotating filtration cylinder 8 for protecting the rotating filtration cylinder 8. The rotating filtration 8 is supported by a pair of first spaced-apart driving members 9 and 9a and a pair of second driving members 10. The first driving members 9 and 9a are positioned at one portion of the rotating filtration cylinder 8 in vicinity of the outlet 3a. The first main driving member 9 comprises a large roller 11 and a small roller 11a. The size of large roller 11 of the first main driving member 9 is the same as to that of roller 11 of the other first driving member 9a. Also, the rotating filtration cylinder 8 is provided with a flat guiding track 12 disposed at one end portion thereof for operatively connecting to the first driving members 9 and 9a. A flat support track 13a overlaps on the flat guiding track 13 for providing a plurality of slots 13 and engaging a plurality of pines 14a disposed at the small roller 11a of the first main driving member 9 for slowly rotating the filtration cylinder 8. The large rollers 11 of the first driving members 9 and 9a are operatively engaged in the flat guiding track 12. The spaced-apart driving members 10 are provided with mountain-shaped rollers 10a for engaging in a V-shaped track 12a disposed at the other end portion of the rotating filtration cylinder 8. The large roller 11 of the first main driving member 9 having a co-axis 18 with the small roller 11a of the first main driving member connects to a power transmission 26. A chain gear 20a connects to the edge of the power transmission shaft 25 and a chain 23 connects to a chain gear 20 placed on the rotating shaft 6. A control valve 27 of the outlet 3a and speed reducing means 26 are connected to the rotating shaft 6 through longitudinal supporters 2 and 19.

The one or more steam injection pipes 16a are provided with a plurality of nozzles 16 for heating the waste product and for cleaning away the dregs which collect in the holes 21 of the rotating filtration cylinder 8 during the filtration operation. The nozzles 16 spray hot steam introduced through the steam injection pipes 16a which connect to a vapor-supply line 15. The housing means 17 contains a insulation material 17a such as epoxies, polyethylene, polystyrene or phenolics. The housing means 17 includes a drain pipe 24 for draining the liquid separated from the solid waste material.

In operation, when the rotating shaft 6 attached to the speed reducing means 26 and supported by the supporters 2 which stands on the supporting foundation 1 is rotated by the motor (not shown), the tapered screw conveying cylinder 4 rotates at a low speed and also the rotating filtration cylinder 8 rotates at a low speed by engaging the pines 14a of the small roller 14 into the slots 13 of the flat support track 13a disposed around the filtration cylinder 8. The waste product is supplied through the inlet 3 formed on the one side of the housing means 17, and is filtered and dehydrated during its movement through the plurality of conveying screws 5. Hot steam supplied through the hot steam-supply line 15 sprays the surface of the rotating filtration cylinder 8 through the nozzles 16 disposed at the steam injection pipes 16a. In such a case, the protein in the waste product is dissolved leaving the solid waste materials mixed with water and the solid waste material (dregs) cleans away from the plurality of holes 21.

The liquid which is filtered through the filter 22 and the plurality of holes 21 of the rotating filtration cylinder 8 is thereby separated from the solid waste materials. Thus, the liquid is drained through the drain pipe 24 and the solid waste material is discharged through the outlet 3a.

When the plurality of conveying screws 5 are abraded, the size of the treatment zone between the rotating cylinder 8 and screw conveying cylinder 4 is widened, the size of the treatment zone is required to become narrower. Therefore, the first spaced-apart driving members 9 and 9a and the second spaced-apart driving members 10 and 10a are moved inwardly, respectively, and so the rotating cylinder 8 goes up automatically for substantially becoming narrower the size of the lower treatment zone between the tapered conveying cylinder 4 and rotating cylinder 8.

According to the present invention, since the hot steam sprays the surface of the rotating cylinder 8 for heating and washing the filtration cylinder, the efficiency of the overall filtration and washing process is substantially improved and the tapered rotating cylinder cannot be cracked. Furthermore, since the filtration cylinder 8 rotates by engaging the pines 14a disposed at the small roller 11a into the slots 13 disposed at the flat supporting track 13a which is disposed at around the filtration cylinder 8, the rotating filtration cylinder 8 rotates at a low speed for substantially improving the overall filtration and washing process.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A filtration apparatus for the treatment of liquid-containing waste product which comprises:

a rotating filtration cylinder having a surface provided with a plurality of holes, a tapered screw conveying cylinder rotatably disposed within said rotating filtration cylinder, said rotating filtration cylinder and said tapered screw conveying cylinder defining a treatment zone therebetween, spaced-apart driving means supporting said rotating filtration cylinder, when said spaced-apart driving means are moved inwardly, for freely changing the size of said treatment zone, inlet means for introducing waste product to be treated to the treatment zone and outlet means for removing treated material from the treatment zone, said treatment zone gradually decreasing from the inlet means to the outlet means thereof, and at least one steam injection pipe containing a plurality of nozzles disposed above said rotating filtration cylinder whereby any solid waste material disposed within said treatment zone and disposed in the holes of the rotating filtration cylinder, is heated and washed by spraying the surface of the rotating filtration cylinder with hot steam by the plurality of nozzles and whereby the rotating filtration cylinder is filtered and washed clean and the size of the treatment zone can be freely changed on demand by moving said spaced-apart driving means relative to each other.

2. The filtration apparatus of claim 1, wherein the tapered screw conveying cylinder contains a plurality of conveying screws disposed thereon.

3. The filtration apparatus of claim 2, wherein the conveying screws are gradually reduced in size from the inlet to the outlet.

4. The filtration apparatus of claim 1, wherein the rotating filtration cylinder is provided with a filter therein.

5. The filtration apparatus of claim 1, wherein the rotating filtration cylinder is provided with a plurality of rigid circumference members disposed around said rotating filtration cylinder.

6. The filtration apparatus of claim 1, wherein the spaced-apart driving means comprises first spaced-apart driving members and second spaced-apart driving members for slidably driving along and supporting the rotating filtration cylinder.

7. The filtration apparatus of claim 6, wherein the first spaced-apart driving members are provided with main driving member including a small roller having co-axis with a large roller, and the other driving member including a large roller having the same size as said large roller.

8. The filtration apparatus of claim 7, wherein the small roller includes a plurality of pines for engaging in a plurality slots of flat track means disposed around the rotating filtration cylinder.

9. The filtration apparatus of claim 7, wherein the pair of large rollers disposed of the pair of first spaced-apart driving members are slidably supported and contact flat track means around the rotating filtration cylinder for freely changing the size of said treatment zone by the movement of the first spaced-apart driving members relative to each other.

10. The filtration apparatus of claim 6, wherein the second spaced-apart driving members have a mountain-shaped roller, respectively, for engaging in a V-shaped track means disposed around the rotating filtration cylinder.

11. The filtration apparatus of claim 10, wherein the pair of mountain-shaped rollers of the pair of second spaced-apart driving members are slidably supported and contacted said V-shaped track means around the rotating filtration cylinder for freely changing the size of said treatment zone by movement of the second spaced-apart driving members relative to each other.

* * * * *